(12) United States Patent
Torii et al.

(10) Patent No.: US 6,719,267 B2
(45) Date of Patent: Apr. 13, 2004

(54) MAGNET VALVE AND FLUID CONTROL APPARATUS USING THE SAME

(75) Inventors: Shigeki Torii, Anjo (JP); Moriharu Sakai, Kariya (JP); Masuhiro Kondo, Obu (JP); Masami Iwamoto, Nagoya (JP); Takayuki Shibata, Nagoya (JP)

(73) Assignees: Denso Corporation, Kariya (JP); Advics Co., Ltd., Kariya (JP)

( * ) Notice: Subject to any disclaimer, the term of this patent is extended or adjusted under 35 U.S.C. 154(b) by 187 days.

(21) Appl. No.: 10/003,696

(22) Filed: Dec. 6, 2001

(65) Prior Publication Data
US 2002/0092998 A1 Jul. 18, 2002

(30) Foreign Application Priority Data

Dec. 13, 2000 (JP) .......................................... 2000-379116
Nov. 29, 2001 (JP) .......................................... 2001-364566

(51) Int. Cl.[7] .............................................. F16K 31/02
(52) U.S. Cl. ............................. 251/129.15; 137/596.17; 335/228
(58) Field of Search ....................... 251/129.15, 129.02; 137/596.17; 335/228

(56) References Cited

U.S. PATENT DOCUMENTS

| | | | | |
|---|---|---|---|---|
| 2,449,438 A | * | 9/1948 | Wisegarver | ................. 335/258 |
| 4,251,789 A | * | 2/1981 | Russell et al. | ............... 335/174 |
| 5,135,027 A | * | 8/1992 | Miki et al. | .............. 137/596.17 |
| 5,428,330 A | * | 6/1995 | Tamemoto | ................... 335/236 |
| 5,704,585 A | | 1/1998 | Hrytzak et al. | |
| 5,779,221 A | | 7/1998 | Staib et al. | |
| 5,791,747 A | * | 8/1998 | Sorensen et al. | ......... 303/119.2 |
| 5,845,672 A | | 12/1998 | Reuter et al. | |
| 6,113,066 A | | 9/2000 | Hohl et al. | |
| 6,124,775 A | * | 9/2000 | Linkner, Jr. | .................. 335/278 |
| 6,409,145 B1 | * | 6/2002 | Fong et al. | ............. 251/129.18 |

FOREIGN PATENT DOCUMENTS

| | | |
|---|---|---|
| DE | 196 04 315 A1 | 8/1997 |
| EP | 0 675 307 A1 | 10/1995 |
| JP | A-9-511965 | 12/1997 |

* cited by examiner

Primary Examiner—Gene Mancene
Assistant Examiner—M A Cartagena
(74) Attorney, Agent, or Firm—Posz & Bethards, PLC

(57) ABSTRACT

A leaf spring for urging a spool toward a flange part of a yoke is provided between a guide fixed to a housing and the spool. Owing to the urging force of the leaf spring, the spool is pressed against the flange part of the yoke, and the yoke can be pressed against the cover through the spool. Thus it is possible to prevent the spool and the yoke from loosening. Further because the leaf spring is provided for each magnet valve, the leaf spring can be commonly used for respective modes of a fluid control apparatus and thus the cost can be reduced.

10 Claims, 9 Drawing Sheets

MAGNET VALVE AND FLUID CONTROL APPARATUS USING THE SAME

BACKGROUND OF THE INVENTION

The present invention relates to a magnet valve having a movable member which moves in correspondence to energization of a coil and non-energization thereof and to a fluid control apparatus using the magnet valve. The present invention is favorably applied to an ABS actuator (fluid control apparatus) of an ABS (antilock braking system) for preventing a wheel from having a tendency to locking by increasing or decreasing a brake fluid pressure of a vehicle.

FIG. 10 is a partly sectional view showing the construction of a magnet valve-mounted portion of the ABS actuator described in laid-open Japanese patent publication Toppyo Hei 9-511965.

In the ABS actuator described in this publication, the yoke 43 held together with the spool 41 and the ring 44 as a unit are pressed against the cover 8 by the leaf spring 200, serving as the elastic member, interposed between the yoke 43 and the housing 7. By restraining the movement of the yoke 43 in this manner, a mechanical load generated by loosening of the yoke 43 is prevented from acting on the terminal 42 and the soldering part 11.

A brake control actuator having an antilock function includes various modes. In a mode, eight magnet valves are used and only the antilock function is realized. In a mode, 10 magnet valves are used and the antilock function, a traction control function, and a brake assist function are realized. In a mode, 12 magnet valves are used and the antilock function and an inline traction control function are realized. In a mode, 14 magnet valves are used and the antilock function, an out-line traction control function, and the inline traction control function are realized.

By the way, the inline traction control has a function of pressurizing with a pump a brake fluid sucked from a duct disposed between a master cylinder and a pressure increase control valve and flowing it to a wheel cylinder when the traction control is performed. The outline traction control has a function of pressurizing with the pump the brake fluid sucked from a reservoir of the master cylinder and flowing it to the wheel cylinder when the traction control is performed.

However, in the conventional actuator described in the publication, by interposing one leaf spring 200 between the housing 7 and the yoke 43 of each of a large number of the magnet valves 3, the yokes 43 of all the magnet valves 3 are supported by one leaf spring 200. Thus the conventional actuator has a problem that it is necessary to prepare a plurality of kinds of the leaf springs 200 corresponding to the above-described respective modes and hence a high cost.

SUMMARY OF THE INVENTION

It is an object of the present invention to prevent a yoke from loosening without using a plurality of kinds of leaf springs corresponding to respective modes of a fluid control apparatus and reduce the cost.

In the first characteristic of the present invention, there is provided a magnet valve which is used as sandwiched between a first sandwiching member and a second sandwiching member. The magnet valve includes a yoke having a cylindrical part and a flange part extending from one end of the cylindrical part to a radially inward side of the cylindrical part and contacting the first sandwiching member; a spool disposed inside the yoke; a coil wound on the spool and forming a magnetic field when the coil is energized; a movable member moving in correspondence to energization and non-energization of the coil; a magnetic path member disposed at the other end of the cylindrical part and fixed to the second sandwiching member and forming a magnetic path; an elastic member disposed between the magnetic path member and the spool and urging the spool toward the flange part, with one end of the elastic member in contact with the magnetic path member and with the other end thereof in contact with the spool.

In the second characteristic of the present invention, there is provided a fluid control apparatus including a magnet valve; a second sandwiching member having a fluid duct, opened and closed by the magnet valve, formed therein; and a first sandwiching member fixed to the second sandwiching member, with the magnet valve sandwiched between the first sandwiching member and the second sandwiching member.

In the third characteristic of the present invention, there is provided a magnet valve including a yoke having a cylindrical part and a flange part extending from one end of the cylindrical part to a radially inward side of the cylindrical part and forming a magnetic path; a spool disposed inside the yoke; a coil wound on the spool and forming a magnetic field when the coil is energized; a movable member moving in correspondence to energization and non-energization of the coil; a magnetic path member disposed at the other end of the cylindrical part and forming a magnetic path; an elastic member disposed between the magnetic path member and the spool and urging the spool toward the flange part, with one end of the elastic member in contact with the magnetic path member and with the other end thereof in contact with the spool The spool and the yoke are so constructed as to be movable relatively to each other in an axial direction of the yoke, and the yoke and the magnetic path member are so constructed as to be movable relatively to each other in the axial direction of the yoke.

In the fourth characteristic of the present invention, there is provided a fluid control apparatus including a magnet valve in which a yoke accommodates a coil and a spool therein and a movable member moves in correspondence to energization and non-energization of the coil; a second sandwiching member disposed at one end of the magnet valve and having a fluid duct, opened and closed by the movable member, formed therein; and a first sandwiching member disposed at the other end of the magnet valve and fixed to the second sandwiching member, with the magnet valve sandwiched between the first sandwiching member and the second sandwiching member. The first sandwiching member has a projection, a front end of which contacts the yoke and which is deformable when the magnet valve is sandwiched between the first sandwiching member and the second sandwiching member.

DETAILED DESCRIPTION OF THE PREFERRED EMBODIMENTS

Figure 1:
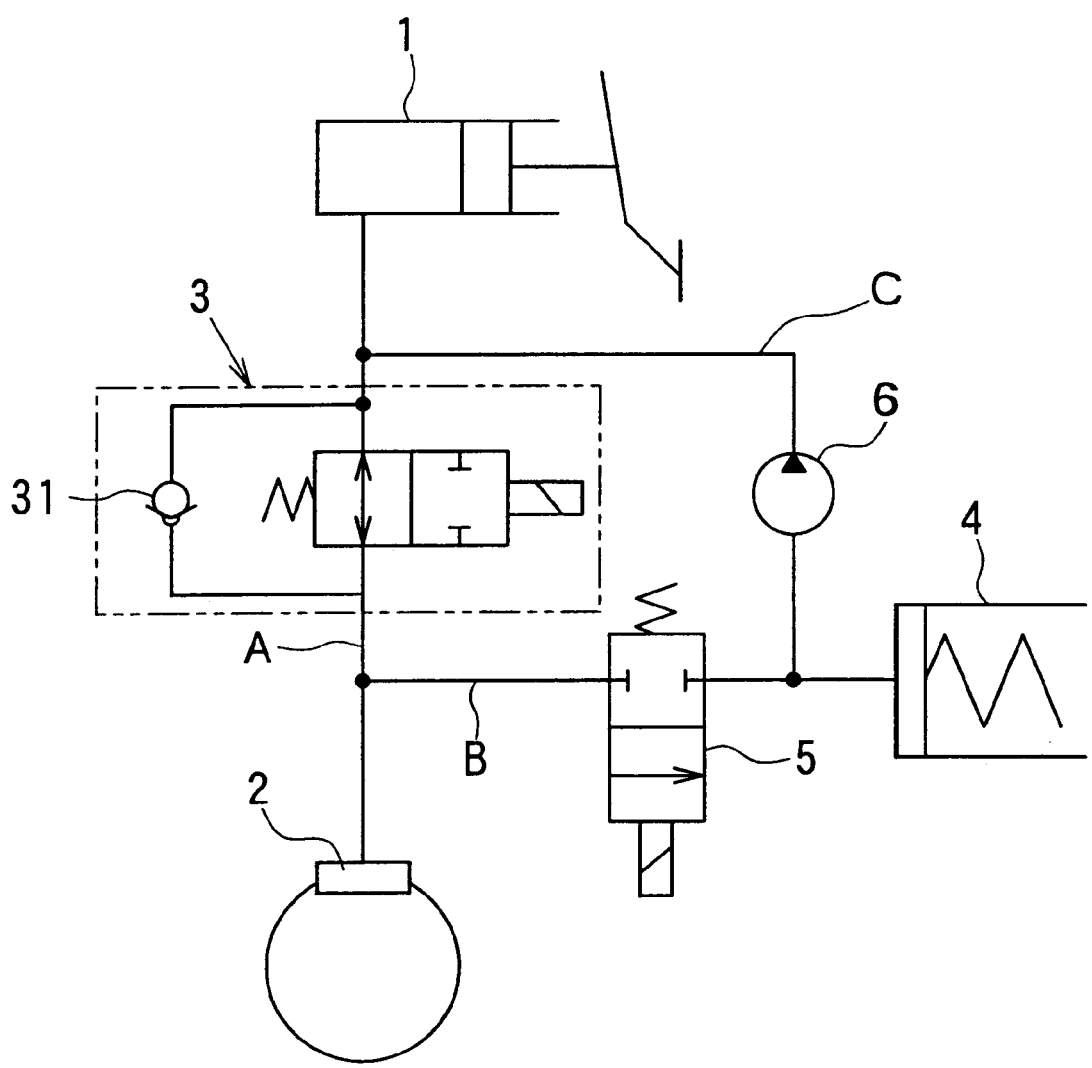
FIG. 1 shows a piping construction of a braking apparatus to which an embodiment of the present invention is applied.

Hereinafter the embodiment of the present invention shown in the drawings will be described.

First Embodiment

FIG. 1 shows the piping construction of a braking apparatus adopting an ABS actuator (fluid control apparatus) that is one embodiment of the present invention.

As shown in FIG. 1, a master cylinder (hereinafter referred to as M/C) 1 and a wheel cylinder (hereinafter referred to as W/C) 2 are connected to each other with a duct A. Through the duct A, a brake fluid is capable of flowing from the M/C 1 to the W/C 2. The duct A is provided with a pressure increase control valve 3 by which a communication and cut-off state of the duct A can be controlled. The pressure increase control valve 3 includes a check valve 31 permitting only a flow of the brake fluid from the W/C 2 to the M/C 1. The pressure increase control valve 3 is a magnet valve according to one embodiment of the present invention. The detail of the pressure increase control valve 3 will be described later.

A duct B connected to a reservoir 4 is connected to a portion of the duct A at the side (downstream side) of the W/C 2 with respect to the pressure increase control valve 3. The duct B is provided with a pressure decrease control valve 5 by which a communication and cut-off state of the duct B can be controlled. The pressure decrease control valve 5 is placed in a cut-off state at a normal braking time and placed in a communication state at a pressure reduction time during the control of an ABS to release the brake fluid inside the duct A into the reservoir 4 to thereby reduce the pressure of the W/C 2.

A portion of the duct A at the side of the M/C 1 (upstream side) with respect to the pressure increase control valve 3 and the reservoir 4 are connected to each other with a duct C. The duct C is provided with a pump 6 that sucks and discharges the brake fluid released into the reservoir 4 so that the pump 6 can return the brake fluid to the duct A.

Figure 2:
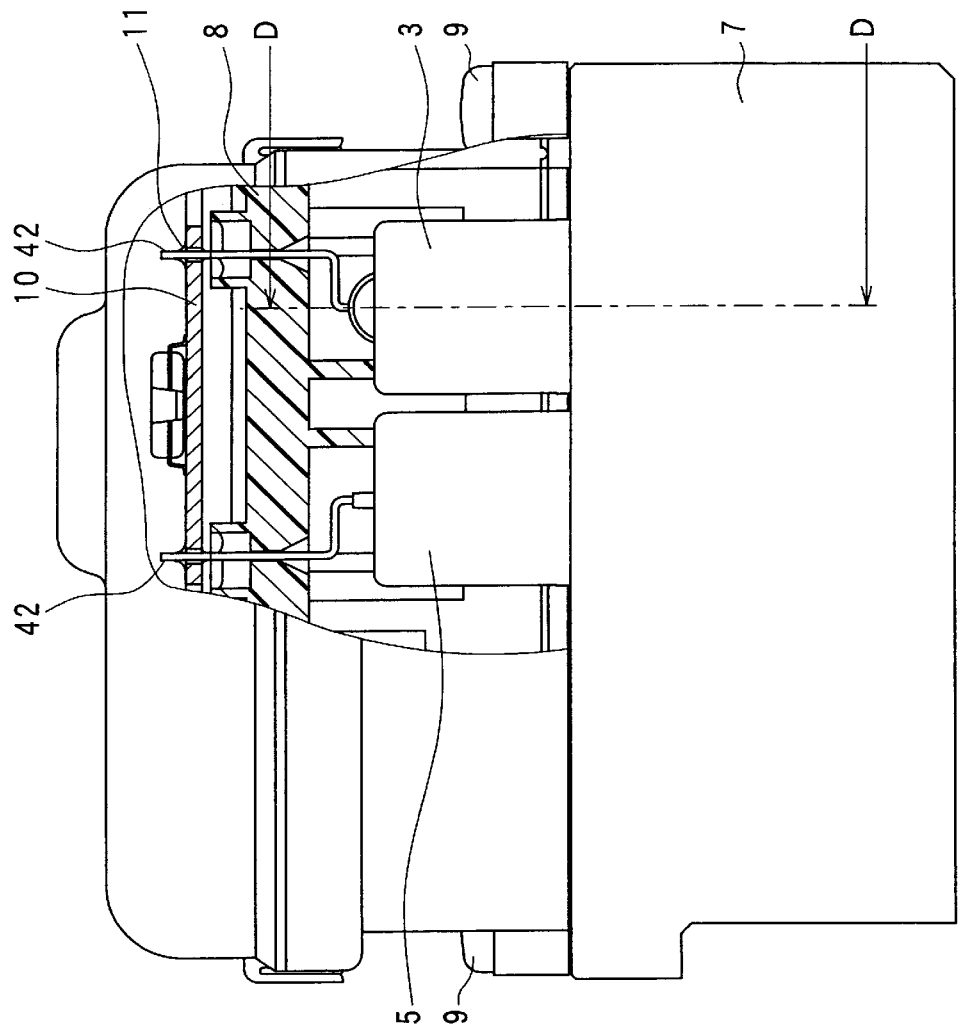
FIG. 2 is a partly sectional view showing an ABS actuator of a first embodiment.

FIG. 2 is a partly sectional view showing the construction of the ABS actuator. In FIG. 2, inside a housing 7 made of aluminum, the reservoir 4 (see FIG. 1) and the pump 6 (see FIG. 1) are accommodated. On one side surface of the housing 7, the pressure increase control valve 3 and the pressure decrease control valve are disposed side by side. A cover 8 made of resin is fixed to the housing 7 with a screw 9. The pressure increase control valve 3 and the pressure decrease control valve 5 are sandwiched between the housing 7 and the cover 8. A terminal 42 taken out from each of the pressure increase control valve 3 and the pressure decrease control valve 5 is soldered to a printed board (bus bar) 10 inside the cover 8 at a soldering part 11 thereof.

The cover 8 is divided into an upper part accommodating the bus bar 10 and a motor-driving circuit and a lower part accommodating the magnet valve and is formed by molding resin monolithically.

Figure 3:
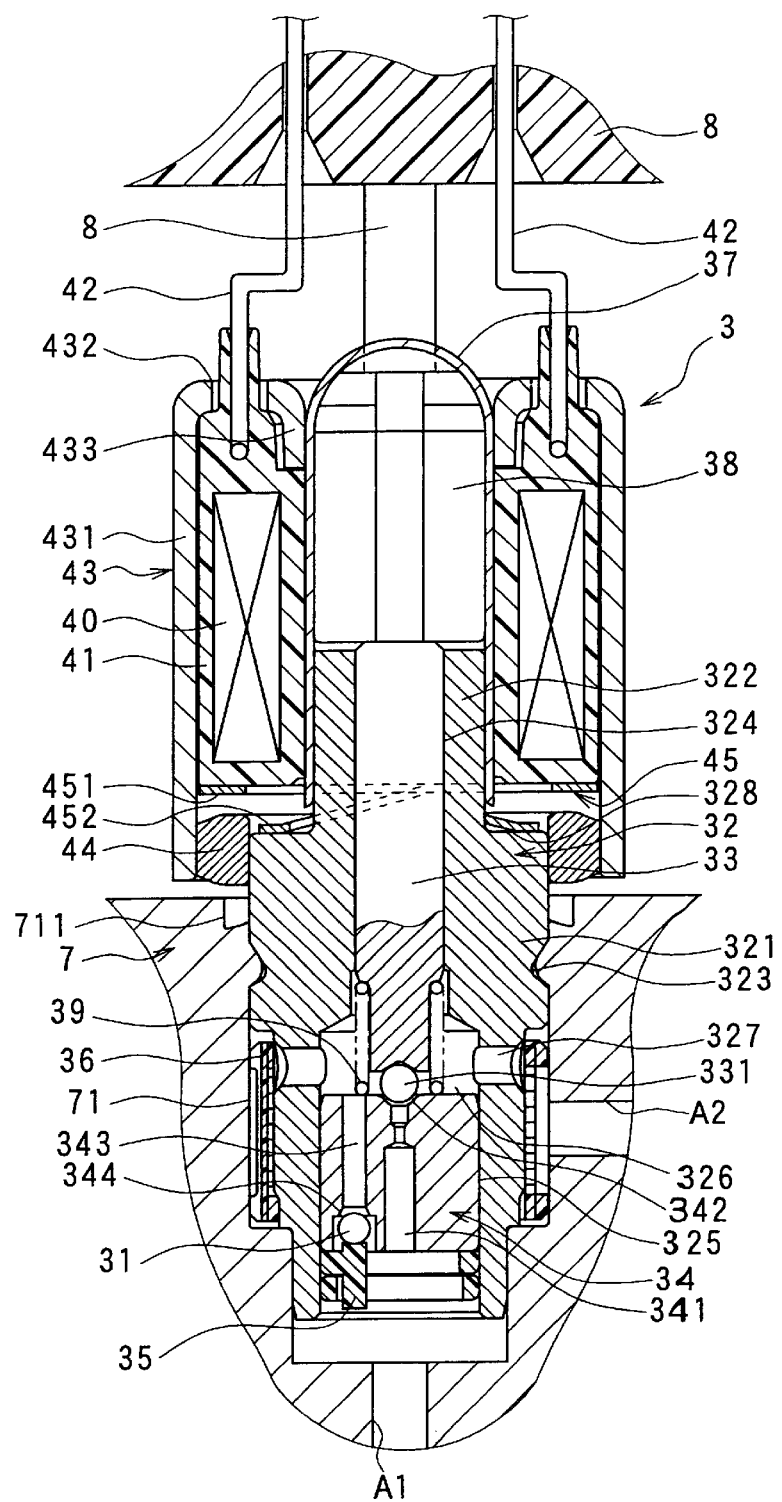
FIG. 3 is a sectional view taken along a line D—D, showing the construction of a pressure increase control valve 3 of FIG. 2.
Figure 4:
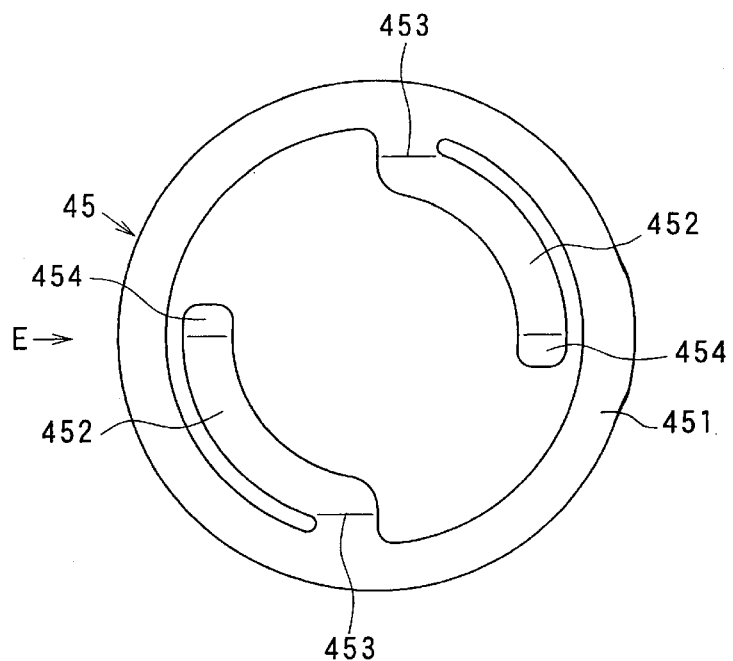
FIG. 4 shows the construction of a ring leaf spring 45 of FIG. 3.
Figure 5:
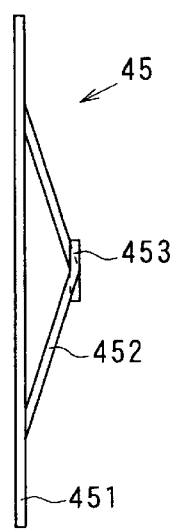
FIG. 5 is E directional view of FIG. 4.

FIG. 3 is a sectional view taken along a line D—D of FIG. 2, showing a sectional construction when the pressure increase control valve 3 is disposed in the housing 7 of the ABS actuator. FIGS. 4 and 5 show the construction of a ring leaf spring 45 inside the pressure increase control valve 3. Hereinafter, with reference to FIGS. 3 through 5, the construction of the pressure increase control valve 3 is described below.

A concavity 71 that is utilized for mounting of the pressure increase control valve 3 is formed on the housing 7. The concavity 71 is formed in communication with the duct A provided in the housing 7. The duct A is so constructed that a duct A1 thereof disposed upstream from the pressure increase control valve 3 is connected to the M/C 1 and a duct A2 thereof disposed downstream from the pressure increase control valve 3 is connected to the W/C 2.

The pressure increase control valve 3 has a guide 32 constituting a magnetic path member made of a magnetic material. The guide 32 is formed in the shape of a stepped column. A part of the guide 32 at the side of a large-diameter part 321 is fitted in the concavity 71 of the housing 7. A part of the large-diameter part 321 of the guide 32 and a small-diameter part 322 project outside from the concavity 71. By caulking an open end 711 of the concavity 71, a part of the housing 7 is penetrated into a concavity 323 formed on the peripheral surface of the large-diameter part 321 to thereby fix the guide 32 to the housing 7.

On the guide 32, there are formed a guide hole 324 located at the side of the small-diameter part 322 and holding a shaft 33 slidably, a seat insertion hole 325 which is located at the side of the large-diameter part 321 and into which a seat 34 is pressed, and a communication hole 327 for communicating a space 326 surrounded with the seat 34 and the seat insertion hole 325 with the duct A2.

The columnar shaft 33 is formed of a nonmagnetic metal (for example, stainless steel). An end of the shaft 33 at the side of the seat 34 projects from the guide hole 324 of the guide 32 and extends to the space 326. A spherical valve 331 is welded to the end of the shaft 33 at the side of the seat 34.

At the radial center of the cylindrical seat 34, a first communication path 341 for communicating the space 326 inside the guide 32 and the duct A1 with each other is formed. At an end of the first communication path 341 at the side of the space 326, a tapered first valve seat 342 with which the valve 331 of the shaft 33 contacts and from which the valve 331 separates is formed.

On the seat 34, a second communication path 343 for communicating the space 326 inside the guide 32 and the duct A1 with each other is formed parallel with the first communication path 341. At an end of the second communication path 343 at the side of the duct A1, a tapered second valve seat 344 with which the spherical check valve 31 contacts and from which the spherical check valve 31 separates is formed.

The check valve 31 is held at a position confronting the second valve seat 344 with a filter 35 pressed into an end of the seat insertion hole 325 of the guide 32. On the periphery of the large-diameter part 321 of the guide 32, a filter 36 is disposed in such a way that the filter 36 surrounds the communication hole 327. The filters 35 and 36 prevent a foreign matter mixed with the brake fluid from penetrating into the pressure increase control valve 3.

A sleeve 37 is fitted on a peripheral side of the small-diameter part 322 of the guide 32. The sleeve 37 is formed of a nonmagnetic metal (for example, stainless steel) and has the shape of a cup whose one end is open and whose bottom surface is approximately spherical.

An approximately columnar plunger 38 made of a magnetic material is disposed on a bottom-surface side of the sleeve 37. The plunger 38 is slidable inside the sleeve 37. The plunger 38 contacts the bottom surface of the sleeve 37. When the plunger 38 contacts the bottom surface of the sleeve 37, the plunger 38 is prevented from sliding in an upward direction of the sheet on which FIG. 3 is drawn.

The shaft 33 is urged toward the plunger 38 by a spring 39 disposed between the shaft 33 and the seat 34. The shaft 33 and the plunger 38 operate together as a unit, with the shaft 33 and the plunger 38 always in contact with each other. The shaft 33 and the plunger 38 constitute a movable member that moves in correspondence to energization of a coil and non-energization thereof.

Around the sleeve 37, a cylindrical spool 41 accommodating a coil 40 forming a magnetic field when it is energized is disposed. The spool 41 made of resin (for example, nylon) is formed by mounting the coil 40 thereon after primary molding is made and then making secondary molding.

The terminal 42 is taken out from the coil 40 and soldered to the printed board (see FIG. 2) 10. The coil 40 is energized through the terminal 42.

A yoke 43 made of a magnetic material is disposed on the periphery of the spool 41. The yoke 43 has an outer cylindrical part 431, a flange part 432 extending from an end of the outer cylindrical part 431 at the side of the cover 8 to a radially inward side of the outer cylindrical part 431, an inner cylindrical part 433 extending axially from an inner peripheral portion 433 of the flange part 432 toward the housing 7, thus forming an approximately cup-shaped configuration. The spool 41 and the sleeve 37 can be accommodated from an opening of the outer cylindrical part 431 at the side of the housing 7.

A ring member 44 made of a magnetic material is pressed into the inner peripheral surface of the opening of the outer cylindrical part 431 at the side of the housing 7. The ring member 44 is disposed in such a way as to surround the large-diameter part 321 of the guide 32.

The spool 41 is freely fitted on the yoke 43 in such a way that the spool 41 is movable relatively to the yoke 43. The spool 41, the yoke 43, and the ring member 44 are freely fitted on the guide 32 and the sleeve 37 in such a way that the spool 41, the yoke 43, and the ring member 44 are movable relatively to the guide 32 and the sleeve 37.

The ring leaf spring 45, made of a metal thin plate (spring material), constituting an elastic member is disposed between the spool 41 and the guide 32. As shown in FIGS. 4 and 5 in detail, the ring leaf spring 45 has a ring part 451 and two projection pieces 452 disposed in confrontation with the inner peripheral side of the ring part 451. The projection piece 452 extends in the shape of a circular arc along the circumferential direction of the ring part 451 and is bent at a bending portion 453 in the vicinity of the boundary between the ring part 451 and the projection piece 452 so that a front end 454 of the projection piece 452 projects in the axial direction of the ring part 451.

As shown in FIG. 3, the ring leaf spring 45 is provided so that the small-diameter part 322 of the guide 32 is positioned at the inner peripheral side of the projection piece 452. The ring part 451 contacts an end surface of the spool 41 at the side of the housing 7. The front end 454 of the projection piece 452 contacts a surface (hereinafter referred to as supporting surface) 328 of a stepped portion between the large-diameter part 321 of the guide 32 and the small-diameter part 322 thereof.

Before the pressure increase control valve 3 having the above-described construction is installed on the housing 7, the coil 40, the spool 41, the terminal 42, the yoke 43, the ring member 44, and the ring leaf spring 45 are integrated with one another as a solenoid part, and other components parts (guide 32, shaft 33, and the like) are integrated with one another as a valve part. Because the inner diameter of the ring member 44 is smaller than the outer diameter of the spool 41 and that of the ring leaf spring 45, the ring member 44 displays a slip-off function, and the spool 41 and the ring leaf spring 45 are held inside the yoke 43.

Initially, the guide 32 is fixed to the housing 7 by fitting the guide 32 of the valve part in the concavity 71 of the housing 7 and caulking the open end 711 of the concavity 71. Thereby the valve part is fixed to the housing 7. Then the solenoid part is mounted on the valve part. Thereafter as shown in FIG. 2, the cover 8 is fixed to the housing 7 with the screw 9, and the pressure increase control valve 3 is sandwiched between the housing 7 and the cover 8.

In the state where the pressure increase control valve 3 is sandwiched between the housing 7 and the cover 8, as shown in FIG. 3, the ring part 451 of the ring leaf spring 45 contacts the end surface of the spool 41, and the front end 454 of the projection piece 452 of the ring leaf spring 45 contacts the supporting surface 328 of the guide 32. Thus the ring leaf spring 45 urges the spool 41 toward the flange part 432 of the yoke 43. Thereby the spool 41 is pressed against the flange part 432 of the yoke 43, and the movement of the spool 41 is restrained.

The spool 41, the yoke 43, and the ring member 44 are freely fitted on the guide 32 and the sleeve 37 in such a way that the spool 41, the yoke 43, and the ring member 44 are movable relatively to the guide 32 and the sleeve 37. Thus the ring leaf spring 45 urges the yoke 43 and the ring member 44 toward the cover 8 through the spool 41. Thereby the flange part 432 of the yoke 43 is pressed against the cover 8, and the movement of the yoke 43 is restrained.

The operation of the pressure increase control valve 3 is described below with reference to FIGS. 1 and 3. FIG. 3 shows the operation state of the pressure increase control valve 3 at the normal braking time, namely, at the time when the coil is not energized. At the time when the coil is not energized, the spring 39 urges the shaft 33 and the plunger 38 toward the bottom surface of the sleeve 37, and the plunger 38 is in contact with the bottom surface of the sleeve 37. The valve 331 of the shaft 33 separates from the first valve seat 342 of the seat 34, and the ducts A1 and A2 communicate with each other via the first communication path 341, the space 326 inside the guide 32, and the communication hole 327 of the guide 32. Therefore at the normal braking time, according to the operation of a braking pedal, the brake fluid flows between the M/C 1 and the W/C 2.

On the other hand, at the pressure reduction time and a holding time during the control of the ABS, i.e., when the pressure increase control valve 3 is closed, the coil 40 is energized. When the coil 40 is energized, the coil 40 forms a magnetic field, and a magnetic path is constructed of the guide 32, the plunger 38, the yoke 43, and the ring member 44. By a magnetic attractive force, the plunger 38 is attracted toward the guide 32, and the shaft 33 and the plunger 38 are moved toward the seat 34 against the urging force of the spring 39, and the valve 331 of the shaft 33 contacts the first valve seat 342 of the seat 34. Thereby the pressure increase control valve 3 closes and the flow of the brake fluid from the duct A1 to the duct A2 is cut off.

At a pressure increase time during the control of the ABS, energization of the coil 40 is stopped. Consequently the pressure increase control valve 3 opens and the brake fluid flows from the duct A1 to the duct A2.

When press-down of the braking pedal is stopped at the pressure reduction time or the holding time during the control of the ABS, i.e., when the pressure increase control valve 3 is closed, the check valve 31 separates from the second valve seat 344 of the seat 34 owing to the difference between the pressure at the M/C 1 and the pressure at the W/C 2, and the duct A1 and the duct A2 communicate with each other via the second communication path 343 of the seat 34, the space 326 inside the guide 32, and the communication hole 327 of the guide 32. Accordingly, the brake fluid flows from the W/C 2 to the M/C 1.

As described above, in the first embodiment, owing to the urging force of the ring leaf spring 45, the spool 41 is pressed against the flange part 432 of the yoke 43, and the yoke 43 can be pressed against the cover 8 through the spool 41. Thus the spool 41 and the yoke 43 can be prevented from loosening. Accordingly it is possible to suppress a mechanical load acting on the terminal 42 and the soldering part 11.

Further since the ring leaf spring 45 is provided for each pressure increase control valve 3, it is possible to use the ring leaf spring 45 commonly for respective modes of the ABS actuator and thus lower the cost.

Furthermore the ring member 44 displays the slip-off function and thus can hold the ring leaf spring 45 and the spool 41 inside the yoke 43.

Figure 10:
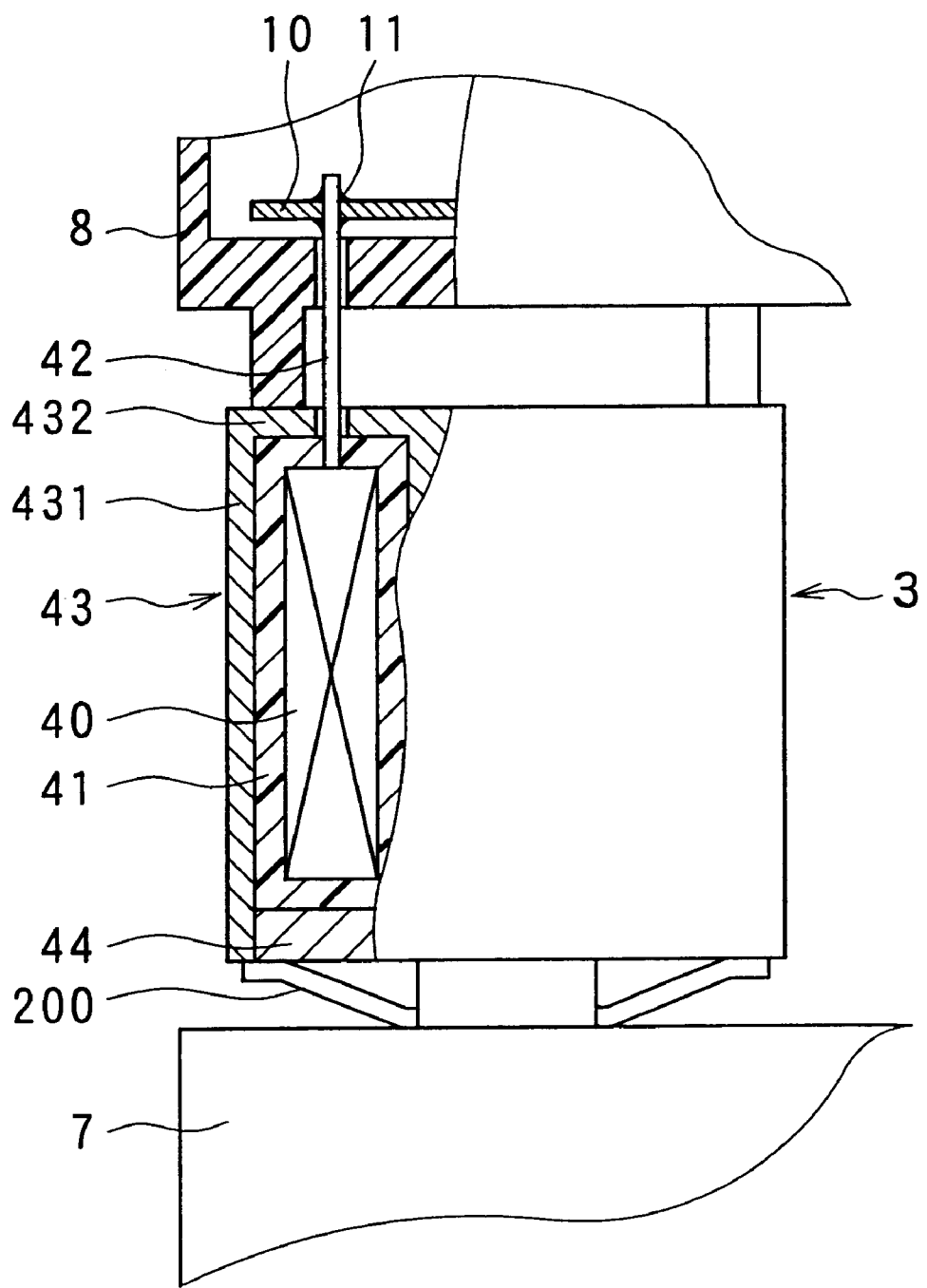

In the conventional magnet valve 3 shown in FIG. 10, the leaf spring 200 can prevent the yoke 43 from loosening, but cannot prevent the spool 41 from loosening relative to the yoke 43. Thus it is conceivable in the magnet valve 3 shown in FIG. 10 that a plurality of projections projecting toward the ring member 44 are formed at one end of the spool 41 in such a way that when the ring member 44 is pressed into the yoke 43, the projections are broken to absorb the size variation of respective component parts so that the coil 40 can be prevented from generating an excessively high stress and the spool 41 is pressed against the flange part 432 of the yoke 43.

In this case, the spool 41 on which the projection is formed has a complicated configuration and thus the cost for forming the spool 41 becomes high. Further the magnet valve 3 becomes large and the ABS actuator becomes large by the height of the projection. In addition, the ABS actuator becomes large by the dimension of the gap in which the leaf spring 200 is provided. Therefore in the case where both the projection and the leaf spring 200 are provided, the constitution of the ABS actuator becomes large.

On the other hand, in the first embodiment, the ring leaf spring 45 absorbs a size variation of the manufactured size of respective component parts and prevents the spool 41 and the yoke 43 from loosening. Thus it is unnecessary to form the projection on the spool 41.

Therefore the configuration of the spool 41 can be simplified and the manufacturing cost of the spool 41 can be reduced. Further the interval between the housing 7 and the cover 8 becomes smaller by the height of the projection and thus the constitution of the ABS actuator can be reduced.

In the case where the projection is formed on the spool 41, on the end surface of the spool 41 at the side of the ring member 44, only the projection receives a force. Thus the surface pressure of the projection is high. Therefore a big stress is locally generated on the spool 41 and the coil 40, which may deteriorate the durability of the coil 40.

In the first embodiment, since the ring part 451 of the ring leaf spring 45 and the spool 41 contact each other, it is possible to make the area of contact between the ring part 451 and the spool 41 comparatively large. Therefore it is possible to reduce the surface pressure of the contact portion and prevent a big stress from being generated on the coil 40 and improve the durability of the coil 40.

Second Embodiment

Figure 6:
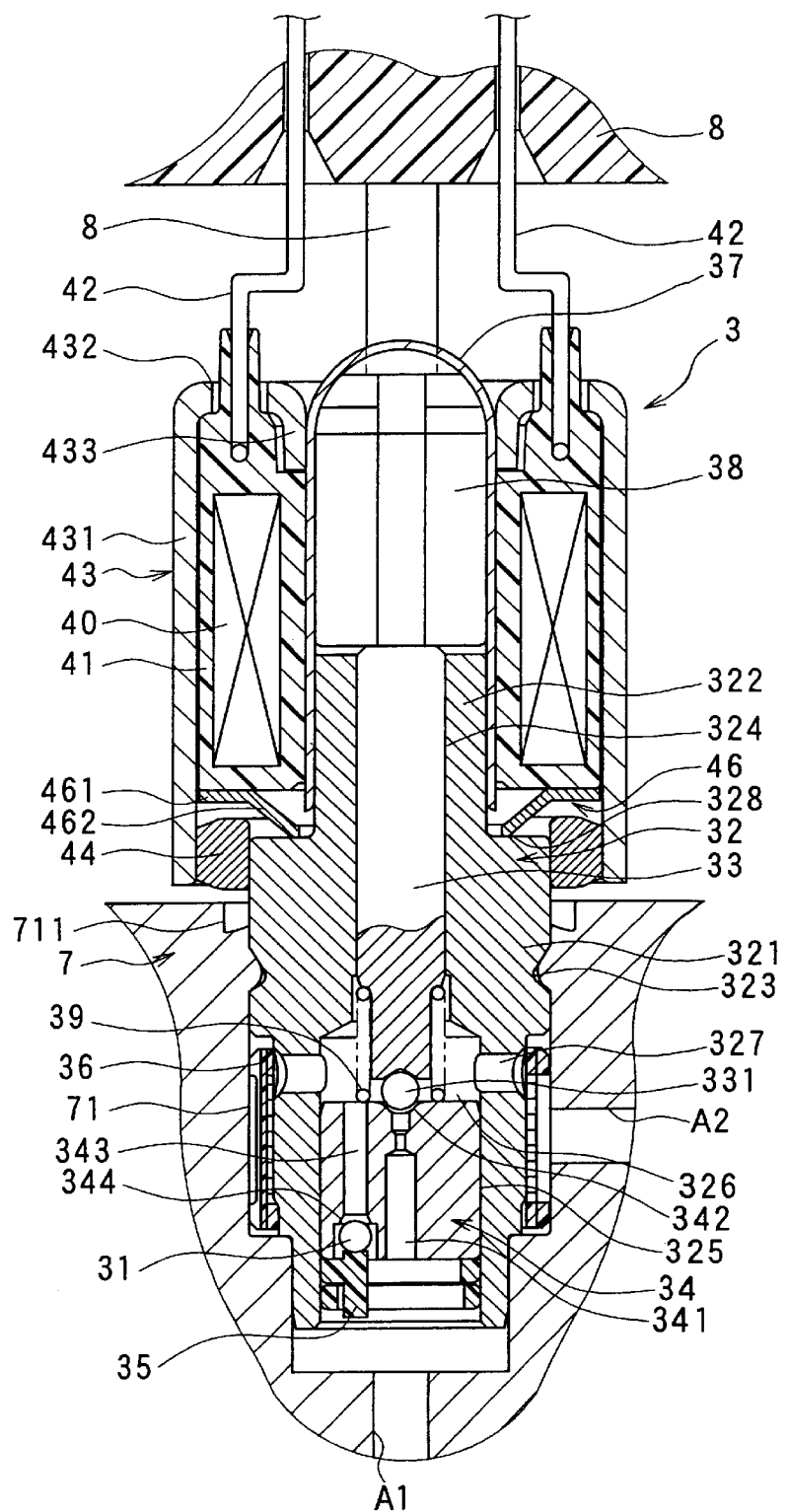
FIG. 6 is a sectional view showing the construction of a pressure increase control valve 3 of a second embodiment.

FIG. 6 shows the sectional construction of the pressure increase control valve 3 of the second embodiment. The pressure increase control valve 3 of the second embodiment has a construction different from that of the pressure increase control valve 3 of the first embodiment. The basic operation of the pressure increase control valve 3 of the second embodiment is similar to that of the pressure increase control valve 3 of the first embodiment. Thus only the construction of the second embodiment different from that of the first embodiment is described below.

As shown in FIG. 6, in the second embodiment, instead of the ring leaf spring 45 of the first embodiment, a belleville spring 46 constituting an elastic member is used. The belleville spring 46 has a ring part 461 and a tapered portion 462 disposed at the inner peripheral side of the ring part 461. A circular hole is formed on the inner peripheral side of the tapered portion 462.

The belleville spring 46 is provided so that the small-diameter part 322 of the guide 32 is located at the inner peripheral side of the tapered portion 462, that the ring part 461 contacts the end surface of the spool 41 at the side of the housing 7, and that the inner peripheral side of the tapered portion 462 contacts the supporting surface 328 of the guide 32. To prevent slip-off of the belleville spring 46, the dimension of the outer diameter of the belleville spring 46 is set larger than that of the inner diameter of the ring member 44.

In the state in which the pressure increase control valve 3 is sandwiched between the housing 7 and the cover 8, the belleville spring 46 urges the spool 41 toward the flange part 432 of the yoke 43 and presses the spool 41 against the flange part 432 of the yoke 43. Thereby the movement of the spool 41 is restrained.

The belleville spring 46 also urges the yoke 43 and the ring member 44 toward the cover 8 through the spool 41 and presses the flange part 432 of the yoke 43 against the cover 8. Thereby the movement of the yoke 43 is restrained.

Third Embodiment

Figure 7:
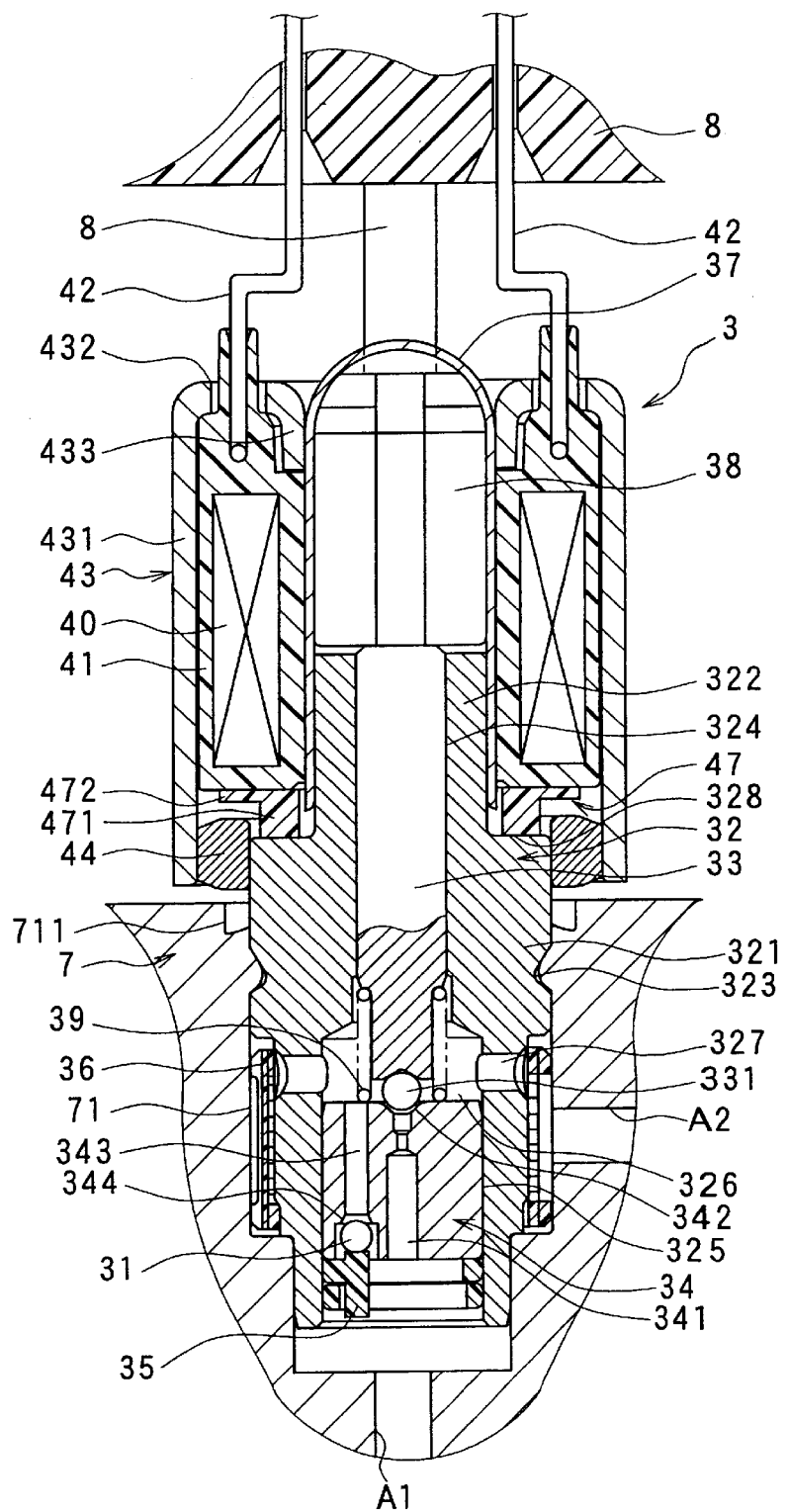
FIG. 7 is a sectional view showing the construction of a pressure increase control valve 3 of a third embodiment.

FIG. 7 shows the sectional construction of the pressure increase control valve 3 of the third embodiment. The pressure increase control valve 3 of the third embodiment has a construction modified from that of the pressure increase control valve 3 of the first embodiment. The basic operation of the pressure increase control valve 3 of the third embodiment is similar to that of the pressure increase control valve 3 of the first embodiment. Thus only the construction of the third embodiment different from that of the first embodiment is described below.

As shown in FIG. 7, in the third embodiment, instead of the ring leaf spring 45 of the first embodiment, a rubber spring 47 constituting an elastic member is used. The rubber spring 47 has a cylindrical part 471 and a flange part 472 disposed at the peripheral side of the cylindrical part 471. The outer diameter of the cylindrical part 471 is set smaller than the inner diameter of the ring member 44. To prevent slip-off of the rubber spring 47, the outer diameter of the flange part 472 is set larger than the inner diameter of the ring member 44. The rubber spring 47 is made of ethylene•propylene•diene copolymer rubber (EPDM), acrylonitrile-butadiene rubber (NBR) or the like.

The rubber spring 47 is provided so that the small-diameter part 322 of the guide 32 is located at the inner peripheral side of the cylindrical part 471, that one end surface of the cylindrical part 471 contacts the end surface of the spool 41 at the side of the housing 7, and that the other end surface of the cylindrical part 471 contacts the supporting surface 328 of the guide 32.

In the state in which the pressure increase control valve 3 is sandwiched between the housing 7 and the cover 8, the cylindrical part 471 of the rubber spring 47 is compressed in its axial direction. Thus the cylindrical part 471 urges the spool 41 toward the flange part 432 of the yoke 43 and presses the spool 41 against the flange part 432 of the yoke 43. Thereby the movement of the spool 41 is restrained.

Further the cylindrical part 471 of the rubber spring 47 also urges the yoke 43 and the ring member 44 toward the cover 8 through the spool 41 and presses the flange part 432 of the yoke 43 against the cover 8. Thereby the movement of the yoke 43 is restrained.

Fourth Embodiment

Figure 8:
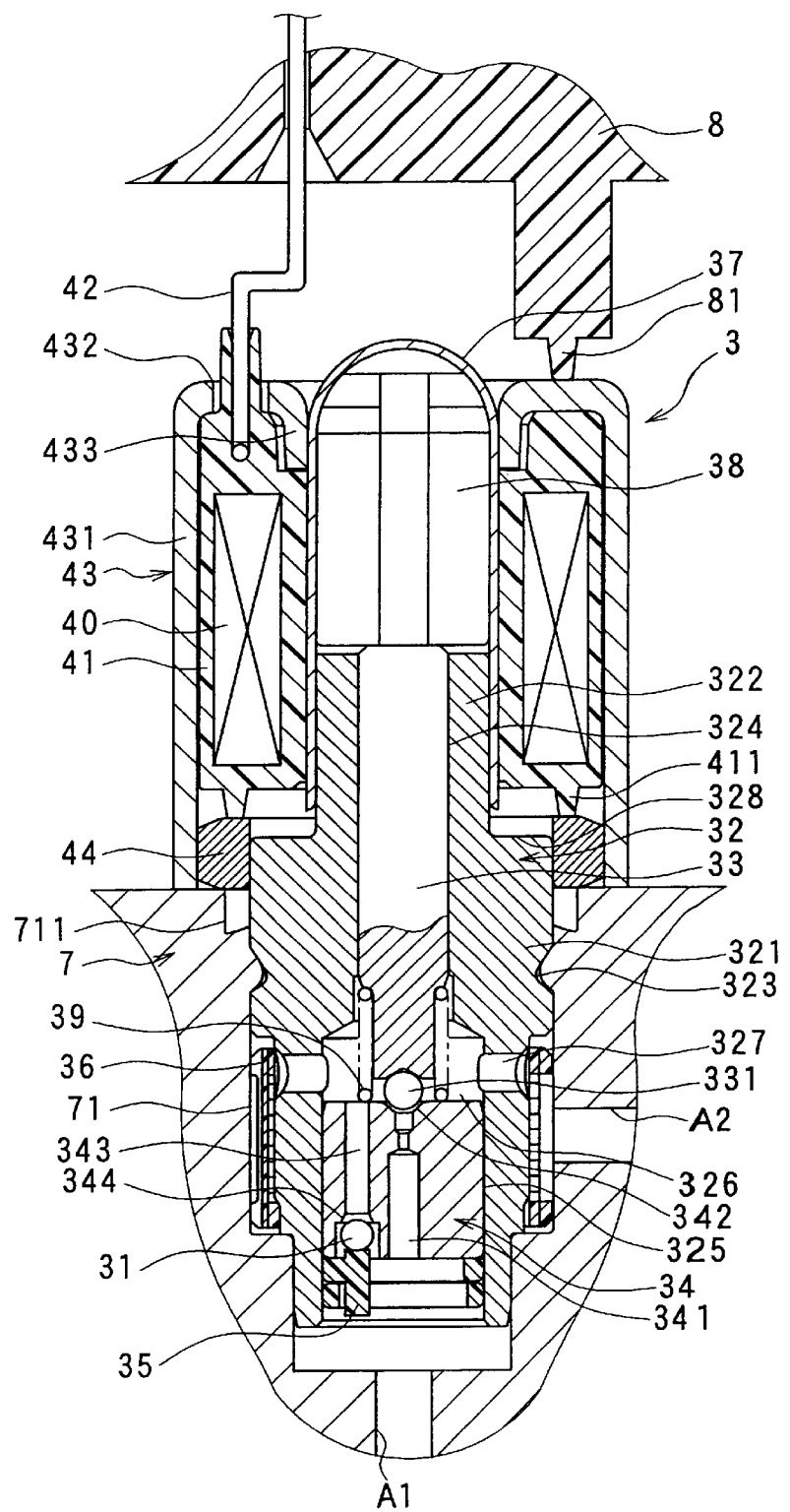
FIG. 8 is a sectional view showing the construction of a pressure increase control valve 3 of a fourth embodiment

FIG. 8 shows the sectional construction of the pressure increase control valve 3 of the fourth embodiment. The pressure increase control valve 3 of the fourth embodiment has a construction partly modified from that of the pressure increase control valve 3 of the first embodiment. Thus the same parts of the fourth embodiment as those of the first embodiment are designated by the reference numerals of the first embodiment, and the description thereof are omitted herein. The pressure increase control valve 3 of the fourth embodiment is applied to the braking apparatus shown in FIG. 1 and as shown in FIG. 2, used, with the pressure increase control valve 3 sandwiched between the housing 7 and the cover 8 of the ABS actuator (fluid control apparatus).

AS shown in FIG. 8, in the fourth embodiment, the spool 41 has a plurality of projections 411 projecting toward the ring member 44. When the ring member 44 is pressed into the yoke 43, the projections 411 are broken. By the breakage of the projections 411, an axial size variation of the spool 41, the yoke 43, and the ring member 44 is absorbed to prevent a force of pressing the spool 41 against the flange part 432 of the yoke 43 from becoming excessively high and prevent the coil 40 from generating an excessively high stress.

Further by pressing the spool 41 against the flange part 432, the spool 41 is prevented from loosening. Accordingly it is possible to suppress the mechanical load acting on the terminal 42 and the soldering part 11 (see FIG. 2).

Further the cover 8 has a plurality of projections 81 projecting toward the flange part 432 of the yoke 43. When the pressure increase control valve 3 is mounted on the housing 7, an open end of the outer cylindrical part 431 of the yoke 43 contacts the housing 7. Then the cover 8 is fixed to the housing 7 with the screw 9 (see FIG. 2). As a result, the projections 81 contact the flange part 432, and the yoke 43 is pressed against the housing 7. Thereby the yoke 43 is prevented from loosening. Accordingly it is possible to suppress the mechanical load acting on the terminal 42 and the soldering part 11.

In this mounting, the projections 81 deform in correspondence to a variation in the dimension of the yoke 43 in its axial direction and in the dimension of the cover 8, whereby the size variation thereof can be absorbed. Therefore it is possible to make the dimensional tolerance of the yoke 43 and the cover 8 gentle.

According to the fourth embodiment, it is possible to eliminate the use of the leaf spring 200 (see FIG. 10) for preventing the loosening of the yoke 43 and make the dimensional tolerance of the yoke 43 and the cover 8 gentle. Thus the cost can be reduced.

Fifth Embodiment

Figure 9:
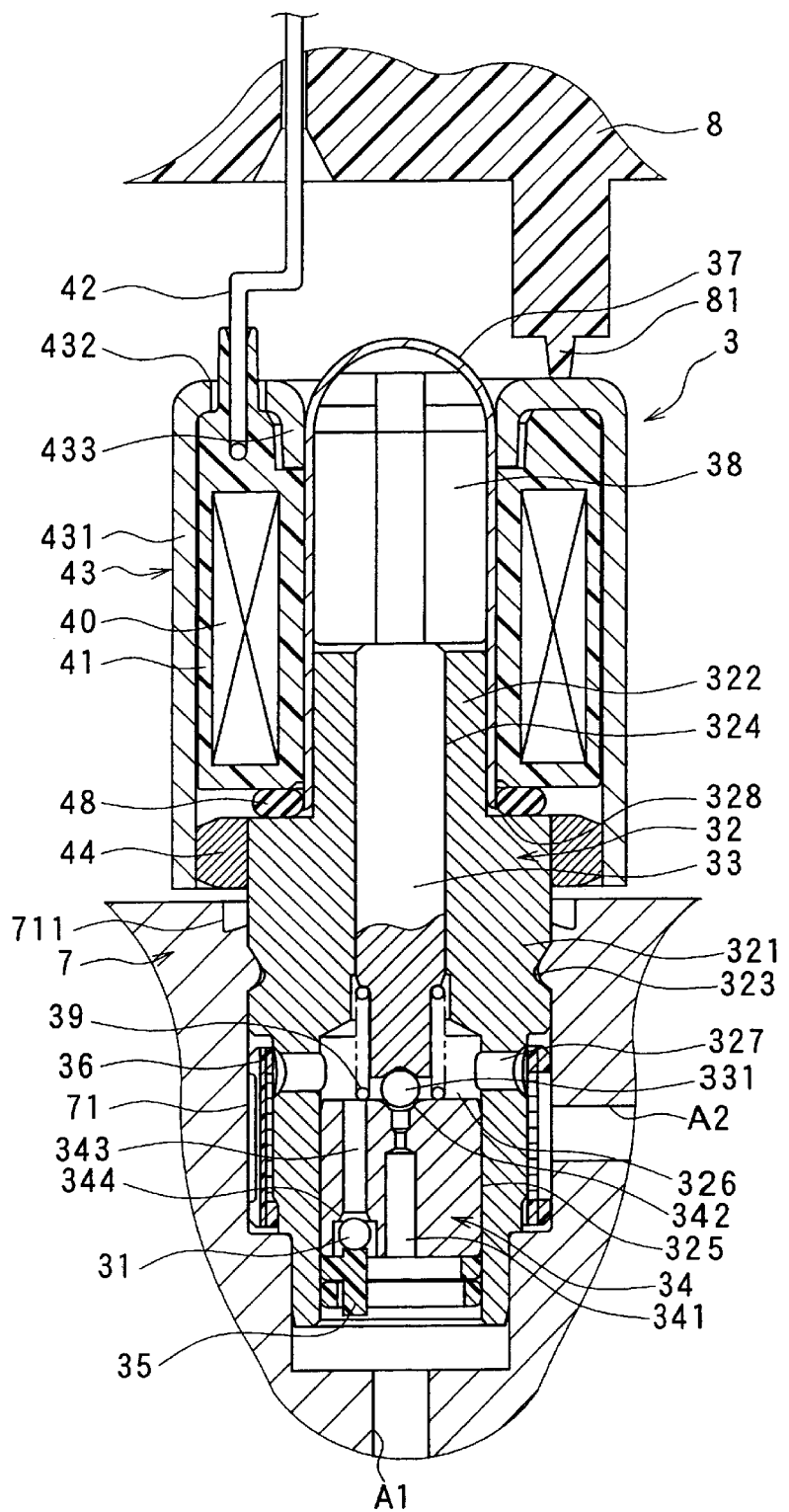
FIG. 9 is a sectional view showing the construction of a pressure increase control valve 3 of a fifth embodiment FIG. 10 a partly sectional view showing the construction of a magnet valve-installing portion of a conventional ABS actuator.

FIG. 9 shows the sectional construction of the pressure increase control valve 3 of the fifth embodiment. The pressure increase control valve 3 of the fifth embodiment has a construction partly modified from that of the pressure increase control valve 3 of the first embodiment. Thus the same parts of the fifth embodiment as those of the first embodiment are designated by the reference numerals of the first embodiment and the description thereof are omitted herein. The pressure increase control valve 3 of the fifth embodiment is applied to the braking apparatus shown in FIG. 1 and as shown in FIG. 2, used with the pressure increase control valve 3 sandwiched between the housing 7 and the cover 8 of the ABS actuator (fluid control apparatus).

As shown in FIG. 9, in the fifth embodiment, instead of the ring leaf spring 45 of the first embodiment, a rubber spring 48 constituting an elastic member is used. The rubber spring 48 is ring-shaped and its sectional configuration is circular in a free state. The rubber spring 48 is made of ethylene•propylene•diene copolymer rubber (EPDM), acrylonitrile-butadiene rubber (NBR) or the like.

The rubber spring 48 is mounted on the spool 41 and the guide 32 in such a way that the small-diameter part 322 of the guide 32 is located at the inner peripheral side of the rubber spring 48, that one end of the rubber spring 48 contacts the end surface of the spool 41 at the side of the housing 7, and that the other end of the rubber spring 48 contacts the supporting surface 328 of the guide 32.

Further the cover 8 has a plurality of projections 81 projecting toward the flange part 432 of the yoke 43.

In the state in which the pressure increase control valve 3 is sandwiched between the housing 7 and the cover 8, the rubber spring 48 is compressed. Thus the rubber spring 48 urges the spool 41 toward the flange part 432 of the yoke 43 and presses the yoke 43 against the projections 81 of the cover 8 through the spool 41. Thereby both the spool 41 and the yoke 43 can be prevented from loosening, whereby it is possible to suppress a mechanical load acting on the terminal 42 and the soldering part 11 (see FIG. 2).

The projections 81 deform in correspondence to the variation in the dimension of the cover 8 and the rubber spring 48, whereby the size variation thereof can be absorbed. Therefore it is possible to make the dimensional tolerance of the cover 8 and that of the rubber spring 48 gentle.

Other Embodiments

The projection 81 (see FIG. 9) of the fifth embodiment may be formed on the cover 8 of the pressure increase control valve 3 of the first through third embodiment. The projection 81 of the cover 8 may be eliminated in the pressure increase control valve 3 of the fifth embodiment.

What is claimed is:

1. A magnet valve sandwiched between a housing and a cover, comprising:

a yoke having a cylindrical part and a flange part extending from one end of said cylindrical part to a radially inward side of said cylindrical part and contacting said housing;

a spool disposed inside said yoke;

a coil wound on said spool and forming a magnetic field when said coil is energized, said coil having a terminal;

a movable member moving in correspondence to energization and non-energization of said coil;

a magnetic path member disposed at the other end of said cylindrical part and fixed to said cover and forming a magnetic path;

an elastic member disposed between said magnetic path member and said spool and urging said spool toward said flange part, with one end of said elastic member in contact with said magnetic path member and with the other end thereof in contact with said spool; and a printed circuit board electrically connected with said terminal;

wherein said cover is disposed between said yoke and said printed circuit board, and wherein said coil, said spool, said yoke, and said terminal are integrally urged toward said cover by said elastic member.

2. A magnet valve according to claim 1, wherein said elastic member is made of a metal thin plate.

3. A magnet valve according to claim 2, wherein said elastic member comprises a ring part contacting said spool and a plurality of projection pieces formed at an inner peripheral side of said ring part and contacting said magnetic path member.

4. A magnet valve according to claim 2, wherein said elastic member is constructed of a belleville spring, a peripheral portion of which contacts said spool, and an inner peripheral portion of which contacts said magnetic path member.

5. A magnet valve according to claim 1, wherein said elastic member is formed of rubber.

6. A magnet valve according to claim 1, further comprising a ring member fixed to an inner peripheral surface of said cylindrical part at said other end thereof, wherein an outer edge of said elastic member is disposed between said spool and said ring member.

7. A fluid control apparatus comprising:

a magnet valve;

a cover disposed at one end of said magnet valve and having a fluid duct, opened and closed by said magnet valve, formed therein; and a housing disposed at the other end of said magnet valve and fixed to said cover, said magnet valve being sandwiched between said housing and said cover, said magnet valve comprising:
- a yoke having a cylindrical part and a flange part extending from one end of said cylindrical part to a radially inward side of said cylindrical part and contacting said housing;
- a spool disposed inside said yoke;
- a coil wound on said spool and forming a magnetic field when said coil is energized, said coil having a terminal;
- a movable member moving in correspondence to energization and non-energization of said coil;
- a magnetic path member disposed at the other end of said cylindrical part and fixed to said cover and forming a magnetic path;
- an elastic member disposed between said magnetic path member and said spool and urging said spool toward said flange part, with one end of said elastic member in contact with said magnetic path member and with the other end thereof in contact with said spool; and
- a printed circuit board electrically connected with said terminal;
- wherein said cover is disposed between said yoke and said printed board, and wherein said coil, said spool, said yoke, and said terminal are integrally urged toward said cover by said elastic member.

8. A fluid control apparatus according to claim 7, wherein a master cylinder and a wheel cylinder of a braking apparatus for a vehicle communicate with each other via said fluid duct formed on said cover, and said cover accommodates a reservoir for temporarily storing a brake fluid at the side of said wheel cylinder.

9. A magnet valve sandwiched between a housing and a cover, said magnet valve comprising:

- a yoke having a cylindrical part and a flange part extending from one end of said cylindrical part to a radially inward side of said cylindrical part contacting said housing, and forming a magnetic path;
- a spool disposed inside said yoke;
- a coil wound on said spool and forming a magnetic field when said coil is energized, said coil having a terminal;
- a movable member moving in correspondence to energization and non-energization of said coil;
- a magnetic path member disposed at the other end of said cylindrical part and forming a magnetic path;
- an elastic member disposed between said magnetic path member and said spool and urging said spool toward said flange part, with one end of said elastic member in contact with said magnetic path member and with the other end thereof in contact with said spool; and
- a printed circuit board electrically connected with said terminal;
- wherein said cover is disposed between said yoke and said printed circuit board, and wherein said spool and said yoke are so constructed as to be movable relative to each other in an axial direction of said yoke, and said yoke and said magnetic path member are so constructed as to be movable relative to each other in said axial direction of said yoke.

10. A fluid control apparatus, comprising:

- a magnet valve sandwiched between a housing and a cover, in which a yoke accommodates a coil and a spool therein and a movable member moves in correspondence to energization and non-energization of said coil, said coil having a terminal;
- a cover disposed at one end of said magnet valve and having a fluid duct, opened and closed by said movable member, formed therein;
- a housing disposed at the other end of said magnet valve and fixed to said cover, with said magnet valve sandwiched between said housing and said cover; and
- a printed circuit board electrically connected with said terminal;
- wherein said cover is disposed between said yoke and said printed circuit board, and wherein said housing has a projection, a front end of which contacts said yoke and which is deformable when said magnet valve is sandwiched between said housing and said cover so as to urge said coil, said spool, said yoke and said terminal toward said cover.

* * * * *